(12) United States Patent
Anderson et al.

(10) Patent No.: US 12,027,837 B2
(45) Date of Patent: Jul. 2, 2024

(54) PATHWAY ISOLATION FITTING FOR A FIBER TROUGH SYSTEM

(71) Applicant: COMMSCOPE TECHNOLOGIES LLC, Hickory, NC (US)

(72) Inventors: Scott Jean Anderson, Burnsville, MN (US); Ruben Arvilla, Chihuahua (MX); John D. Schmidt, Minneapolis, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 209 days.

(21) Appl. No.: 17/611,858

(22) PCT Filed: May 15, 2020

(86) PCT No.: PCT/US2020/033211
§ 371 (c)(1),
(2) Date: Nov. 16, 2021

(87) PCT Pub. No.: WO2020/236627
PCT Pub. Date: Nov. 26, 2020

(65) Prior Publication Data
US 2022/0216678 A1 Jul. 7, 2022

Related U.S. Application Data

(60) Provisional application No. 62/849,443, filed on May 17, 2019.

(51) Int. Cl.
*H02G 3/04* (2006.01)
*G02B 6/36* (2006.01)

(52) U.S. Cl.
CPC ......... *H02G 3/0456* (2013.01); *G02B 6/3616* (2013.01)

(58) Field of Classification Search
CPC ............ H02G 3/32; H02G 3/34; H02G 3/263; H02G 3/0437; H02G 3/40; H02G 3/128;
(Continued)

(56) References Cited

U.S. PATENT DOCUMENTS

| 8,143,521 B2 | 3/2012 | Burek et al. |
| 2002/0121571 A1 | 9/2002 | Ferris et al. |

(Continued)

FOREIGN PATENT DOCUMENTS

| JP | H07-298446 A | 1/1995 |
| JP | 2015-017696 A | 1/2015 |
| WO | 02/071766 A2 | 9/2002 |

OTHER PUBLICATIONS

International Search Report and Written Opinion of the International Searching Authority for International Patent Application No. PCT/US2020/033211 dated Aug. 31, 2020, 10 pages.
(Continued)

*Primary Examiner* — Roshn K Varghese
(74) *Attorney, Agent, or Firm* — Merchant & Gould P.C.

(57) ABSTRACT

A fitting for a fiber trough. The fitting includes a bottom cable support surface and a pair of opposite side walls extending from the bottom cable support surface that define a channel. The fitting is mounted to a fiber trough so that the channel is positioned within another channel defined by the fiber trough, isolating a cable routing path defined by the fitting channel from a cable routing path defined by the trough channel.

26 Claims, 12 Drawing Sheets

(58) Field of Classification Search
CPC .... H02G 3/105; H02G 3/0418; H02G 3/0456; H02G 3/30; H02G 3/0608; H02G 3/0406; H02G 7/06; H02G 7/08; H02G 7/10; H02G 7/12; H02G 9/065; G02B 6/3616; G02B 6/4459; G02B 6/381; F16L 3/23; F16B 5/121; H01B 11/22
See application file for complete search history.

(56) References Cited

U.S. PATENT DOCUMENTS

| | | | |
|---|---|---|---|
| 2009/0308654 A1* | 12/2009 | Hill | H02G 3/0406 |
| | | | 174/481 |
| 2012/0074268 A1* | 3/2012 | McMath | H02G 3/32 |
| | | | 248/58 |
| 2017/0023156 A1* | 1/2017 | Hoffman | H02G 3/0608 |
| 2022/0090706 A1* | 3/2022 | Ottersbach | H02G 3/32 |
| 2022/0384968 A1* | 12/2022 | Gutt | H02G 3/32 |

OTHER PUBLICATIONS

Accessories Catalog, FiberGuide® Fiber Management System, ADC Telecommunications, 1 page (Admitted Prior Art as of May 17, 2019).

Enlarged view of Accessories Catalog, FiberGuide® Fiber Management System, ADC Telecommunications, 1 page (Admitted Prior Art as of May 17, 2019).

\* cited by examiner

PATHWAY ISOLATION FITTING FOR A FIBER TROUGH SYSTEM

CROSS-REFERENCE TO RELATED APPLICATION

This application is a National Stage Application of PCT/US2020/033211, filed on May 15, 2020, which claims the benefit of U.S. Patent Application Ser. No. 62/849,443, filed on May 17, 2019, the disclosures of which i-s are incorporated herein by reference in their entireties. To the extent appropriate, a claim of priority is made to each of the above disclosed applications.

TECHNICAL FIELD

This disclosure relates to a system for the management of wires and fibers that carry telecommunications signals. More particularly, this disclosure relates to fittings used with troughs and the routing of signal carrying fibers (e.g., optical fibers) and wires (e.g., copper wires) in different regions of the trough defined by the fittings.

BACKGROUND

Telecommunications networks employ lengths of signal carriers, such as optical fibers and copper wires. The wires and fibers are routed between signal distribution equipment, such as closures, panels, racks, cabinets, and so forth, that serve as distribution nodes between a network provider and network subscribers. Relatively large scale nodes or distribution centers that serve a large number of subscribers can include multiple racks supporting equipment (e.g., cassettes, patch panels, shelves, trays) used to interconnect and distribute fibers and wires. In certain applications, optical fibers and copper wires are routed to the appropriate rack or other telecommunications equipment in the distribution center using troughs. The troughs can be suspended from a structure above the racks or mounted to the tops of the racks. The troughs define a system of channels for routing fibers and wires to desired locations. The channel system can be provided with downspouts, exitways, and other features to guide a given fiber or wire to a desired piece of telecommunications equipment positioned below the trough system.

SUMMARY

In general terms, the present disclosure is directed to a wire or fiber pathway isolation fitting that is configured to be inserted in and mounted to a sidewall of a trough of a fiber trough system. The wires and fibers are typically carried in telecommunications cables, such as optical fiber cables, copper coaxial cables, copper twisted pair cables, and hybrid optical fiber-copper cables.

In an example use application, the fitting can be used to isolate copper wires from optical fibers that are routed in the same trough. However, the disclosure is not limited by the particular use of the fitting and the trough to which the fitting is mounted.

For example, an optical fiber can be supported by the fitting while the bottom surface of the trough can support copper cable or vice versa, and/or both the fitting and the bottom surface of the trough can support the same type of signal conduits (copper, optical, etc.).

Optical fibers can be sensitive to external loads. The weight of thick or large numbers of copper cables carrying copper wires can damage or cause undesirable bending of optical fibers if the copper cable(s) are positioned on top of the optical fibers in the trough.

Features of the present disclosure can minimize potentially damaging loads exerted by cables on relatively fragile fibers by isolating the intra-trough routing paths of the cables (e.g., copper cables) from the intra-trough routing paths of the optical fibers.

In some examples, an isolation fitting in accordance with the present disclosure is configured to be mounted at a plurality of selectable positions to a trough or plurality of troughs.

In some examples, multiple of the isolation fittings can be inserted and mounted to a sidewall of a trough at intervals along a given length of the trough.

The distance of the intervals can be selected to, e.g., prevent the cables held by the fittings from contacting a bottom surface of the trough while also, e.g., minimizing the total number of fittings required for a given length of trough.

In some examples, the fittings are substantially rigid and can be made of molded or machined materials, e.g., a sheet metal or a relatively rigid polymeric material.

In some examples, the fittings are made from electrically non-conductive material.

In some examples, the fitting can include coupling features for securely coupling the fitting to the sidewall of the trough.

In some examples, a fastener is used to couple the fitting to the sidewall of the trough.

In some examples, a fastener is not needed and the fitting's coupling feature is configured to self-mount to the sidewall of the trough without a separate fastener. In addition, the fittings can be configured to be easily de-coupled from and recoupled to a trough, allowing for easy customization and modification of a pathway isolation system within a trough system.

In some examples, the fitting can be sized such that it does not contact the bottom surface of the trough to which it is mounted, thereby enabling optical cables to pass between the bottom surface of the trough and the fitting, while still extending sufficiently deep into the trough to accommodate a desired number of bulk cables. The maximum interior depth $D1$ of the fitting is a measure of a distance between a bottom cable support surface of the fitting and the top of the shortest sidewall of the fitting, while the maximum interior depth $D2$ of the trough is a measure of the distance between the top of the trough sidewall and the bottom cable support surface of the trough. A ratio of $D1:D2$ can be selected to, e.g., maximize the bulk of cables that can be supported by the bottom cable support surface of the fitting while ensuring a desirable spacing or gap between the bottom cable support surface of the trough and the fitting. For example, a ratio of $D1:D2$ can be in a range from about 19:20 to about 1:2, or outside of this range. The maximum interior width $W1$ of the fitting is defined as a maximum interior distance between its sidewalls. The maximum interior width $W2$ of the trough is defined as the maximum interior distance between its sidewalls. For example, a ratio of $W1:W2$ can be, e.g., 1:2 or smaller, such as 1:3, 1:4, 1:5, 1:6, 1:7, 1:8, 1:9, 1:10, or anywhere in a range from 1:2 to 1:10, as well as ratios outside of this range.

According to certain aspects of the present disclosure, a system comprises: a pathway isolation fitting, the pathway isolation fitting being mountable to a fiber trough having a first bottom cable support surface and first and second opposite sidewalls extending from opposite ends of the first bottom cable support surface, the first and second sidewalls and first bottom cable support surface defining a first channel, the pathway isolation fitting being configured to be mounted to one of the first and second sidewalls and partially positioned in the first channel, the pathway isolation fitting including a second bottom cable support surface and third and fourth opposite sidewalls extending from the second bottom cable support surface, the third and fourth sidewalls and the second bottom cable support surface defining a second channel, the second channel being within the first channel when the fitting is mounted to the trough, the second bottom cable support surface including a planar portion or defining a concavity that faces away from the first bottom cable support surface when the fitting is mounted to the trough.

According to further aspects of the present disclosure, a system comprises: a fiber trough having a first bottom cable support surface and first and second opposite sidewalls extending from opposite ends of the first bottom cable support surface, the first and second sidewalls and first bottom cable support surface defining a first channel; and a pathway isolation fitting mounted to one of the first and second sidewalls and partially positioned in the first channel, the pathway isolation fitting including a second bottom cable support surface and third and fourth opposite sidewalls extending from the second bottom cable support surface, the third and fourth sidewalls and the second bottom cable support surface defining a second channel, the second channel being within the first channel, the second bottom cable support surface including a planar portion or defining a concavity that faces away from the first bottom cable support surface.

According to further aspects of the present disclosure, a system comprises: a fiber trough having a first bottom cable support surface and first and second opposite sidewalls extending from opposite ends of the first bottom cable support surface, the first and second sidewalls and first bottom cable support surface defining a first channel; and a pathway isolation fitting mountable at any of a plurality of locations to one of the first and second sidewalls such that the fitting is partially positioned in the first channel, the pathway isolation fitting including a second bottom cable support surface and third and fourth opposite sidewalls extending from the second bottom cable support surface, the third and fourth sidewalls and the second bottom cable support surface defining a second channel, the second channel being within the first channel when the fitting is mounted to the trough, the second bottom cable support surface including a planar portion or defining a concavity that faces away from the first bottom cable support surface; wherein the pathway isolation fitting is configured to be moved from one of the location and mounted at another of the locations.

According to still further aspects of the present disclosure, a system comprises: a first plurality of cables; a second plurality of cables; a fiber trough having a first bottom cable support surface and first and second opposite sidewalls extending from opposite ends of the first bottom cable support surface, the first and second sidewalls and first bottom cable support surface defining a first channel; and a pathway isolation fitting mounted to one of the first and second sidewalls and partially positioned in the first channel, the pathway isolation fitting including a second bottom cable support surface and third and fourth opposite sidewalls extending from the second bottom cable support surface, the third and fourth sidewalls and the second bottom cable support surface defining a second channel, the second channel being within the first channel, wherein the first plurality of optical cables are routed through the first channel and are supported by the first bottom cable support surface; and wherein the second plurality of optical cables are routed through the second channel and are supported by the second bottom cable support surface.

A variety of examples of desirable product features or methods are set forth in the description that follows, and in part, will be apparent from the description, or may be learned by practicing various aspects of this disclosure. The aspects of this disclosure may relate to individual features, as well as combinations of features. It is to be understood that both the foregoing general description and the following detailed description are explanatory only, and are not restrictive of the claimed inventions.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
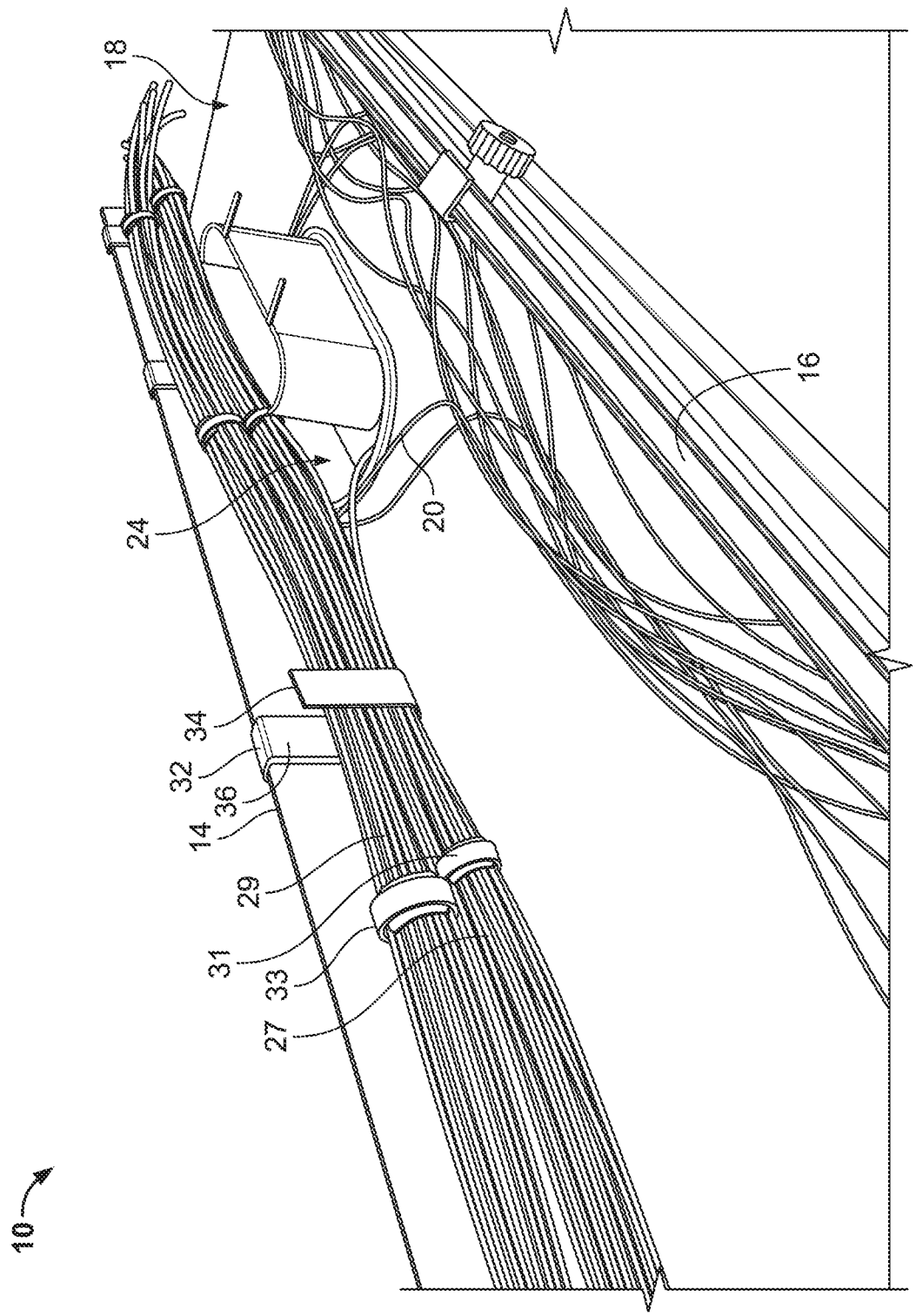
FIG. 1 depicts an example system in accordance with the present disclosure, including an embodiment of a fiber trough supporting optical fibers and an embodiment of a pathway isolation fitting mounted to the fiber trough and supporting cables.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
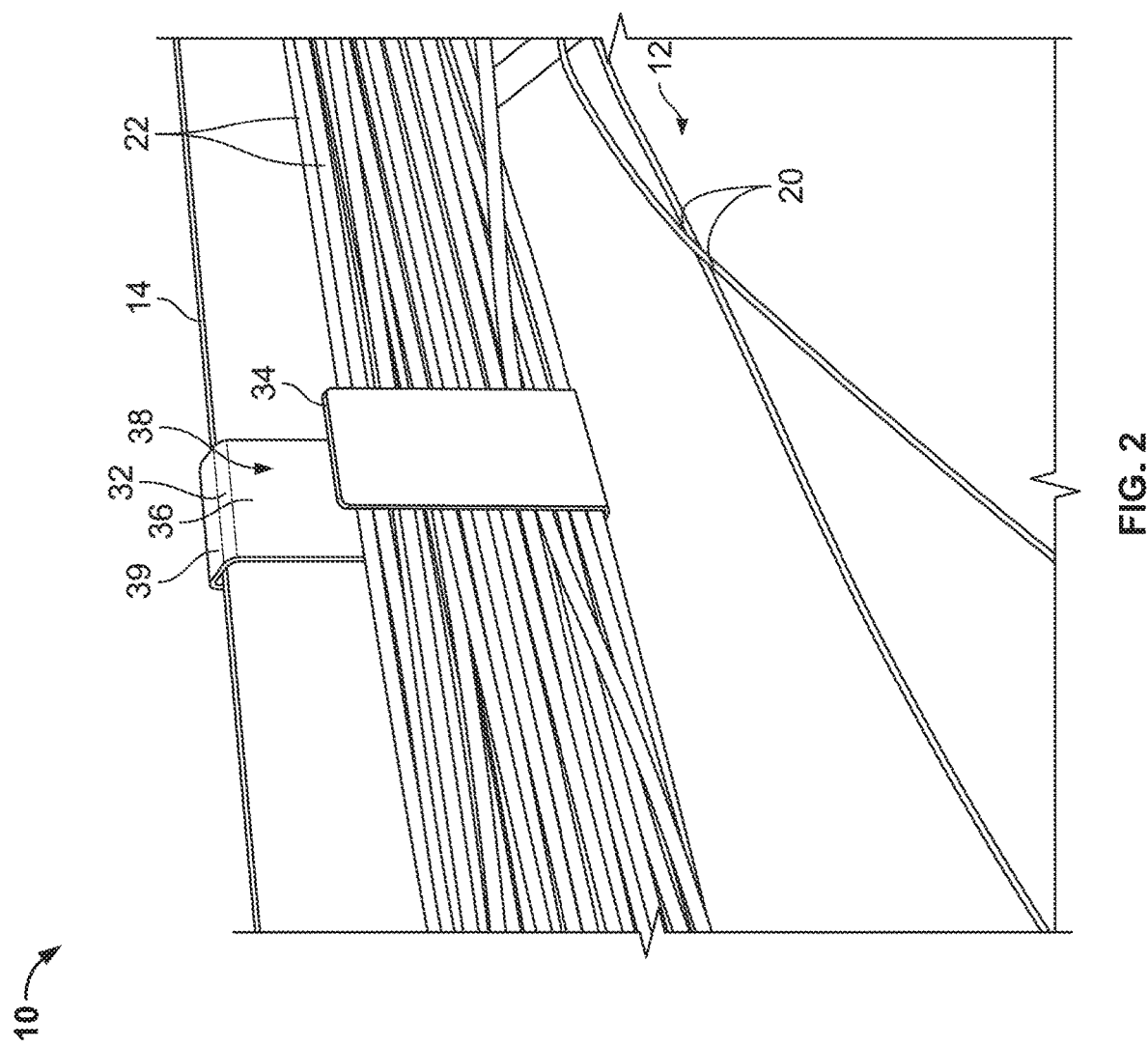
FIG. 2 depicts a portion of the system of FIG. 1.
Figure 17:
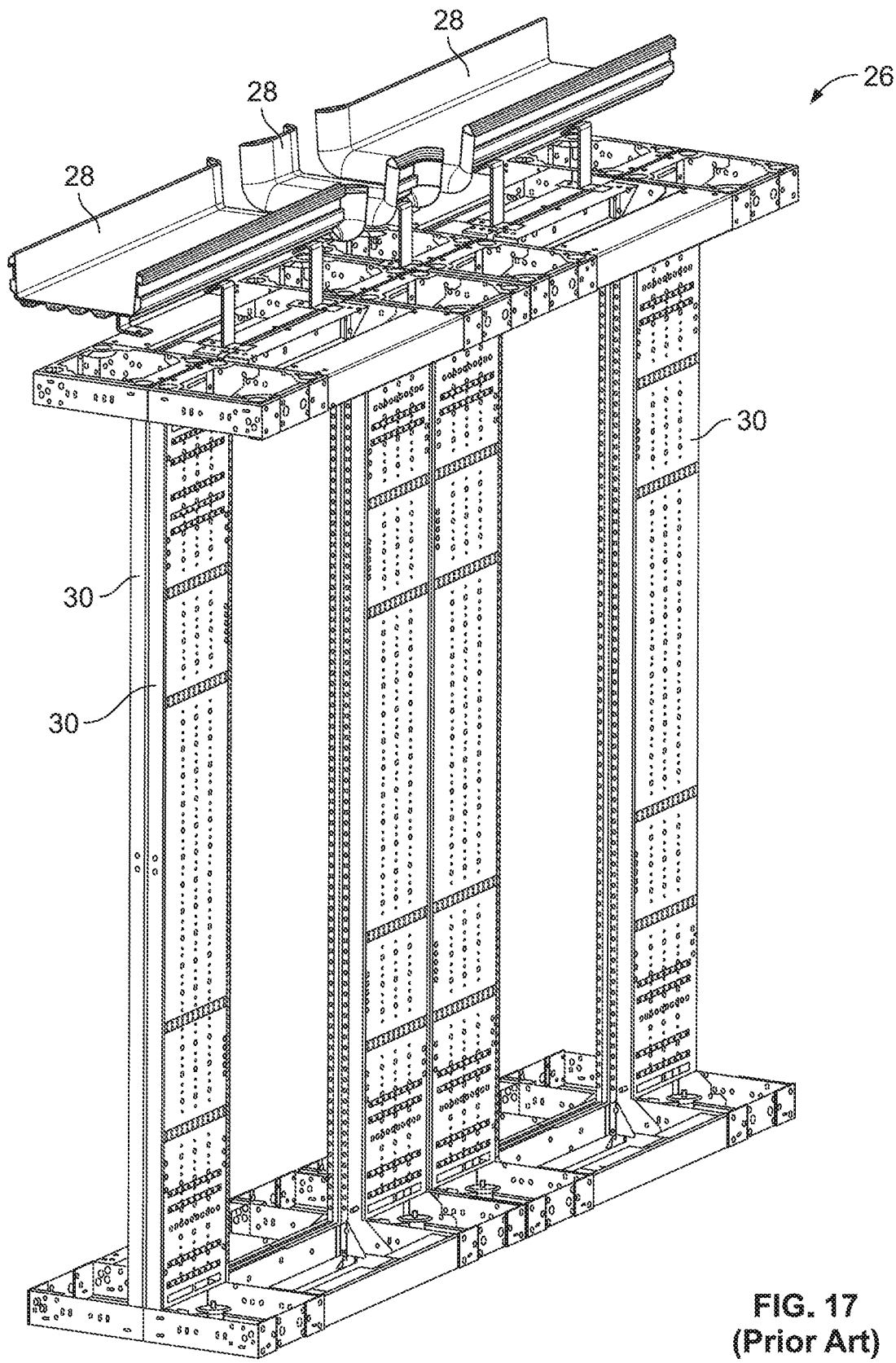
FIG. 17 is a perspective view of an example rack and trough system to which one or more pathway isolation fittings in accordance with the present disclosure can be mounted.

Referring to FIGS. 1-2, a fiber trough 10 includes a bottom cable support surface 12 and a pair of opposite sidewalls 14, 16 extending upwards from the bottom cable support surface 12. The bottom cable support surface 12, and sidewalls 14 and 16 define a channel 18 for supporting and guiding optical fibers 20 and cables 22. The trough 10 can be arranged together with other troughs or trough components to create a channel system. Such a channel system can be supported, e.g., above telecommunications equipment. The troughs can include exitways or, e.g., downspouts such as the downspout 24 to guide desired cables from the channel 18 to a particular component of telecommunications equipment, such as patch panel, splice cassette, shelf, etc. For example, referring to FIG. 17, an example arrangement 26 of fiber troughs 28 supported above telecommunications racks 30 is depicted. In this example, the troughs 28 are mounted to the racks 30. In other examples, the troughs can be, e.g., suspended from a ceiling or other support structure positioned above the racks. Cables routed in the troughs 28 can be routed down to the racks 30 as needed. The racks 30 can support any of a number of different types of cable management and/or connectivity equipment.

Referring again to FIGS. 1-2, a pathway isolation fitting 32 is mounted to the sidewall 14 and partially inserted into the channel 18. The fitting 32 includes opposite sidewalls 34, 36 extending upward from a bottom cable support surface which, together with the sidewalls 34 and 36 defines a substantially U-shaped or squared U-shaped sub-channel 38 within the channel 18. A flange 39 extends from the sidewall 36 and over the top of the sidewall 14. The fitting 32 is coupled to the trough 10 exteriorly to the channel 18. The sub-channel 38 is at least partially isolated from the remainder of the channel 18 within which it is positioned. Cables 22 are supported by the bottom cable support surface of the fitting 32 and within the sub-channel 38, thereby isolating the pathway of the cables 22 within the trough 10 from the pathway of the fibers 20 supported by the bottom cable support surface 12. Thus, for example, external loads exerted by the cables 22 against the fibers 20 can be minimized. In some examples, the cables 22 carry copper conductors, such as copper wires. In some examples the cables 22 carry optical fibers. In some examples the cables 22 carry both copper conductors and optical fibers. The cables or fibers can be bundled in bundles, such as the bundles 27, 29 of cables 22, which are bundled by wraps 31, 33 at intervals. Different bundles of cables can be routed to different locations.

A plurality of the fittings 32 can be positioned at intervals along the longitudinal dimension of the sidewall 14 such that the cables 22 can be supported within the sub-channels formed by the fittings 32 along an entire longitudinal length of the trough 10.

The fitting 32 is sized such that there is a gap between the bottom of the fitting 32 and the bottom cable support surface 12 of the trough 10. Thus, fibers 20 supported by the bottom cable support surface 12 can pass underneath the fitting 32.

Figure 3:
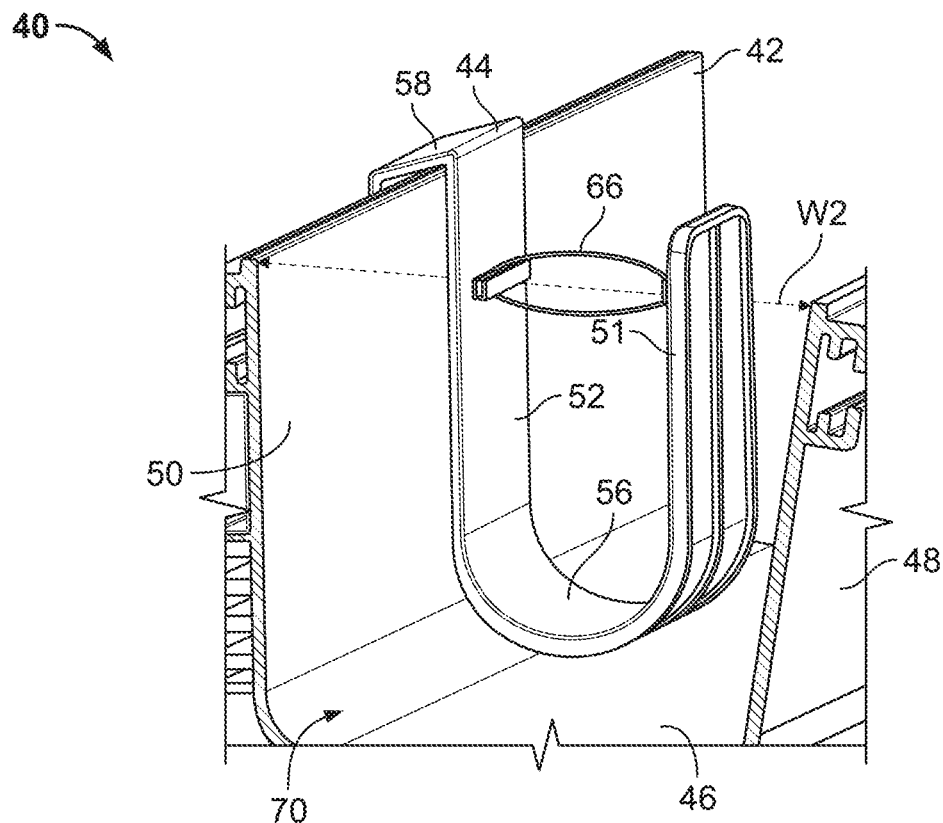
FIG. 3 depicts a portion of a system including a further embodiment of a fiber trough and a further embodiment of a pathway isolation fitting mounted to the fiber trough.
Figure 4:
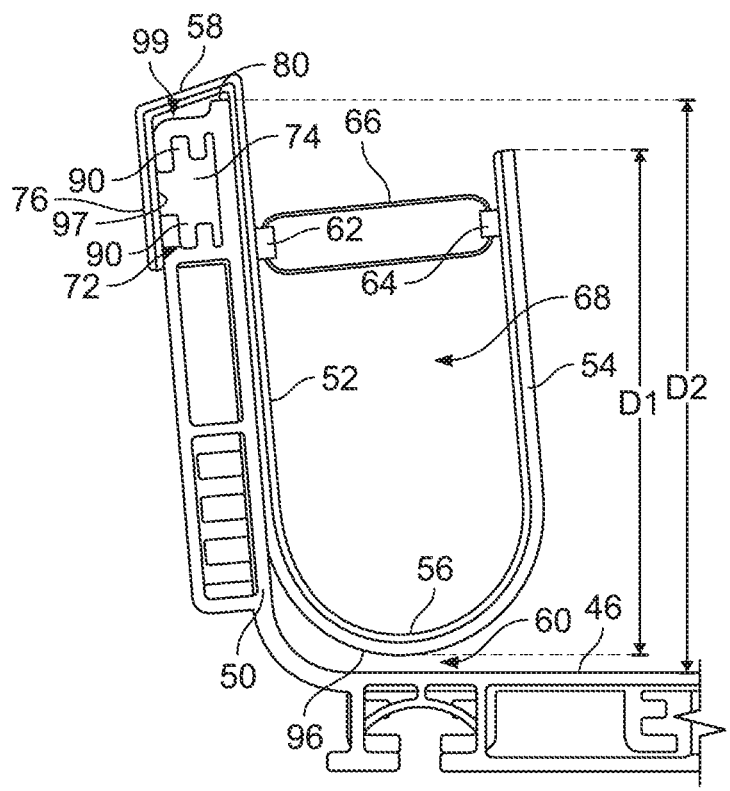
FIG. 4 is an end view of a portion of the system of FIG. 3.
Figure 5:
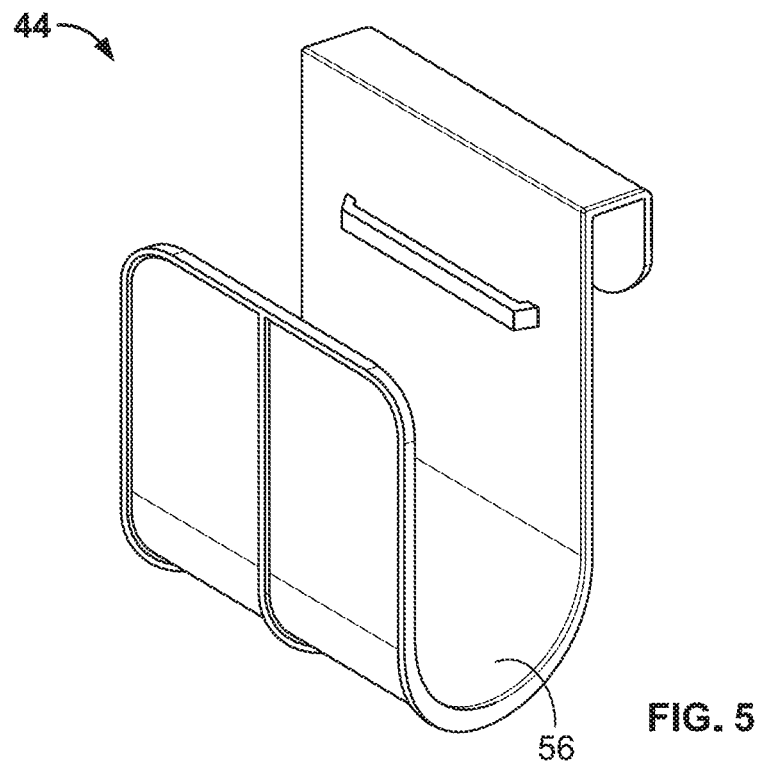
FIG. 5. is a perspective view of the pathway isolation fitting of FIG. 3.

Referring now to FIGS. 3-6, a system 40 includes a fiber trough 42 and a pathway isolation fitting 44. The trough 42 includes a bottom cable support surface 46 for supporting fibers and a pair of opposing sidewalls 48 and 50 which, together with the bottom cable support surface 46 define a channel 70 for a fiber routing pathway. The fitting 44 includes first and second opposing sidewalls 52 and 54 and a bottom cable support surface 56 that has a concavity facing away from the support surface 46. The bottom cable support surface 56 and sidewalls 52 and 54 together define a channel 68 which is a sub-channel within the channel 70 and isolated from the rest of the channel 70. The channel 68 is U-shaped in cross-section, as shown in FIG. 4.

Figure 14:
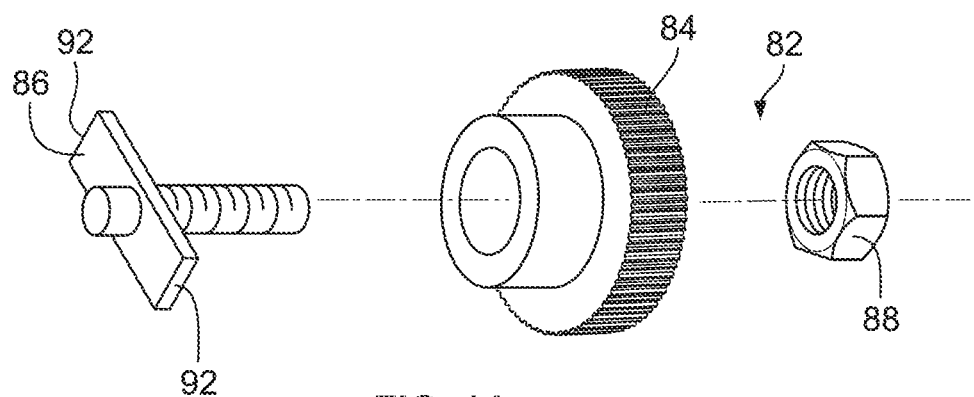
FIG. 14 is an exploded view of an example fastener assembly that can be used to fasten a pathway isolation fitting of the present disclosure to a fiber trough.

A flange 58 of the fitting 44 extends from the sidewall 52 at an oblique angle to the sidewall 52 and a projecting wall 76 extends from the flange 58 parallel to the sidewall 52. The flange 58 extends over a top 80 of the sidewall 50. The projecting wall 76 is configured to be coupled to a coupling feature 72 of the sidewall 50. In particular, the feature 72 defines a T-shaped recess 74. Referring to FIG. 14, an example fastener assembly 82 includes a knob 84, a T-shaped engaging element 86 and a nut 88. The nut 88 can be used to rotationally secure the knob 84 to the T-shaped engaging element 86. For example, both the nut 88 and the T-shaped engaging element 86 can be complementarily threaded. The T-shaped engaging element 86 can be passed through a notch or fully enclosed hole defined by the projecting wall 76 and into the T-shaped recess 74. Then, the knob 84 can be rotated (e.g., 90 degrees) such that the ends 92 of the of cross-member of the T-shaped engaging element 86 enter the complementarily shaped portions 90 of the T-shaped recess 74, thereby securing the fitting 44 to the sidewall 50 of the trough 42.

Referring again to FIGS. 3-6, the channel 68 can be used to support one type of cable, wire or fiber that is different from wires, fibers, or cables supported by the bottom surface 46 of the trough 42. The fitting 44 is sized such that there is a gap 60 between the bottom surface 46 of the trough 42 and the bottom 96 of the fitting 44, allowing fibers to pass underneath the fitting 44. A depth D1 of the channel 68 is defined as the distance between a top of the sidewall 54 (which is the shorter of the two sidewalls 52 and 54) and the curvature inflection point of the bottom cable support surface 56. A depth D2 of the channel is defined as the distance between the top 80 of the sidewall 50 and the lowest most point of the bottom cable support surface 46. A ratio of D1:D2 can be selected to, e.g., maximize the bulk of wire or fiber that can be supported by the bottom cable support surface 56 while ensuring a desirable gap 60 between the bottom cable support surface 46 and the fitting 44. For example, a ratio of D1:D2 can be in a range from about 19:20 to about 1:2, or outside of this range.

The maximum interior width W1 of the fitting 44 is defined as a maximum interior distance between the sidewalls 52 and 54. The maximum interior width W2 of the trough 42 is defined as the maximum interior distance between the sidewalls 48 and 50 of the trough 42. A ratio of W1:W2 can be, e.g., 1:2 or smaller, such as 1:3, 1:4, 1:5, 1:6, 1:7, 1:8, 1:9, 1:10, or anywhere in a range from 1:2 to 1:10, as well as ratios outside of this range. The ratio can be based on one or more parameters of a given trough system, such as a corresponding the number of optical fibers or potential number of optical fibers to be supported in the trough, and the number of cables or wires or potential number of cables or wires to be supported by the fitting.

An assembly kit for a trough system in accordance with the present disclosure can include fittings of different sizes to enhance customizability of pathway isolation for a given trough or for a plurality of differently configured or differently used troughs.

Still referring to FIGS. 3-6, projecting interiorly from the sidewalls 52, 54 are a pair of strap retainers 62 and 64. A tie or strap 66 (depicted schematically) can be looped through slots defined by the retainers 62 and 64 and tightened to help stabilize the width W1 between the sidewalls 52, 54 even when the fitting 44 is heavily loaded with cables, which may otherwise cause unwanted flexing or bending of the sidewall 54 away from the sidewall 52. Thus, by using the strap 66, the size and shape of the channel 68 can be substantially maintained regardless of the weight of cable, wire, or fiber supported by the bottom cable support surface 56.

Figure 6:
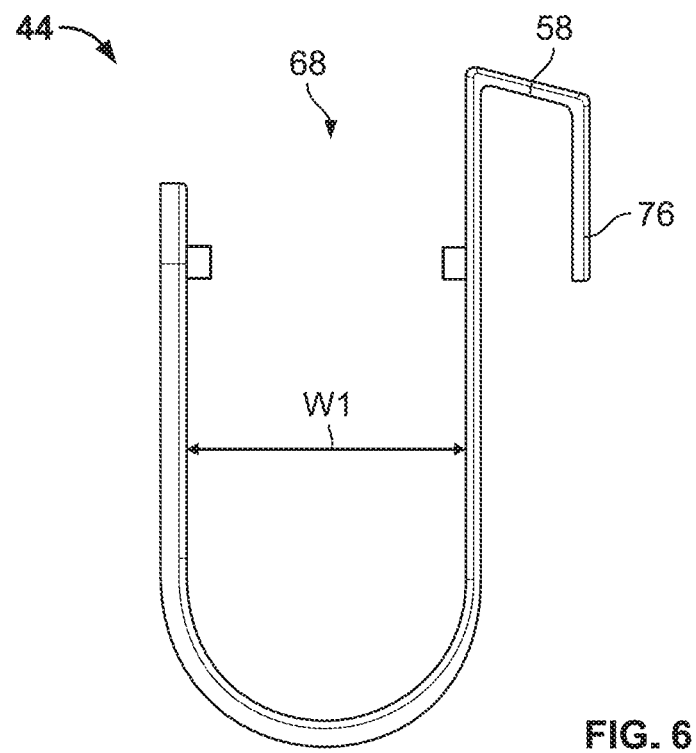
FIG. 6 is an end view the pathway isolation fitting of FIG. 3.
Figure 7:
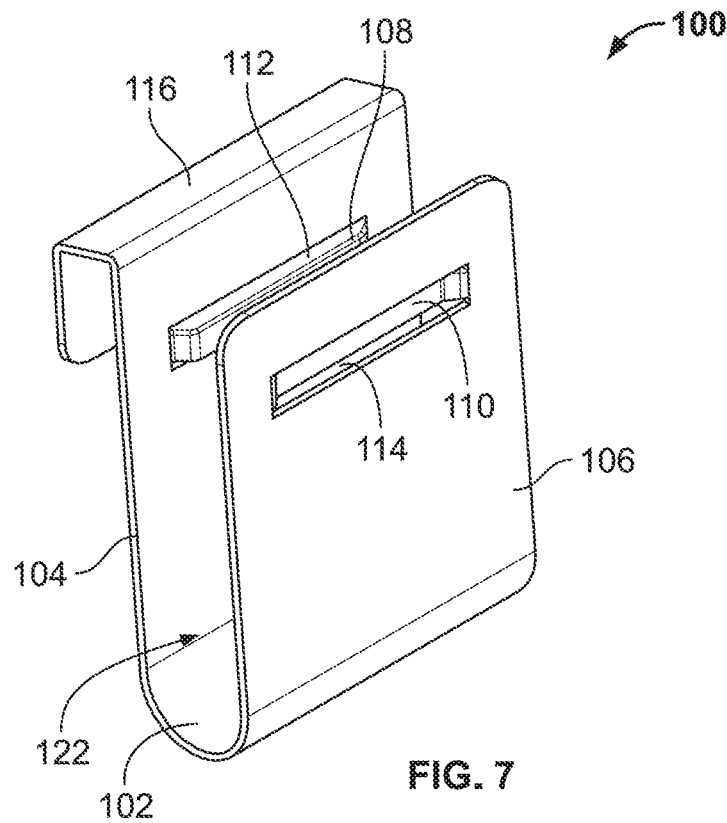
FIG. 7 is a perspective view of a further embodiment of a pathway isolation fitting in accordance with the present disclosure.
Figure 8:
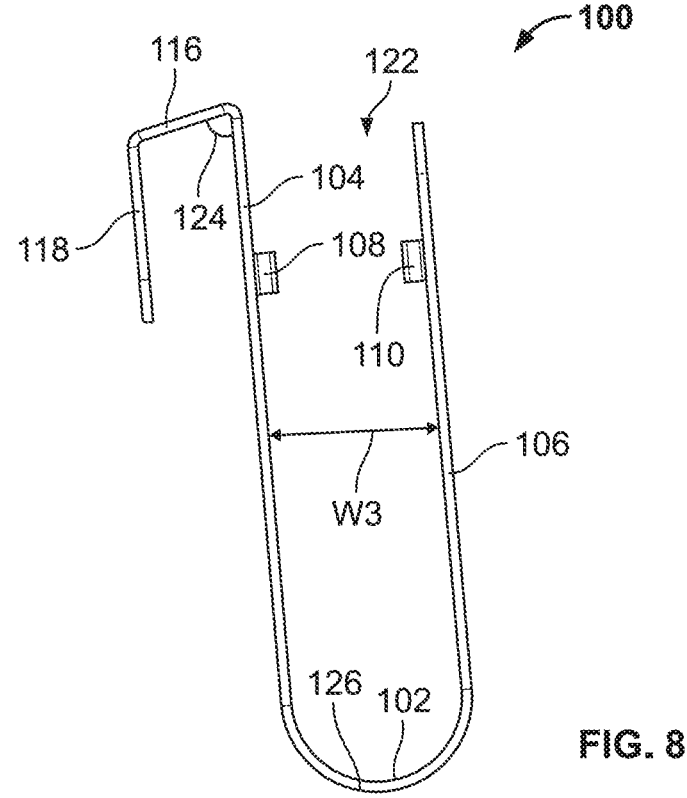
FIG. 8 is an end view of the pathway isolation fitting of FIG. 7.
Figure 9:
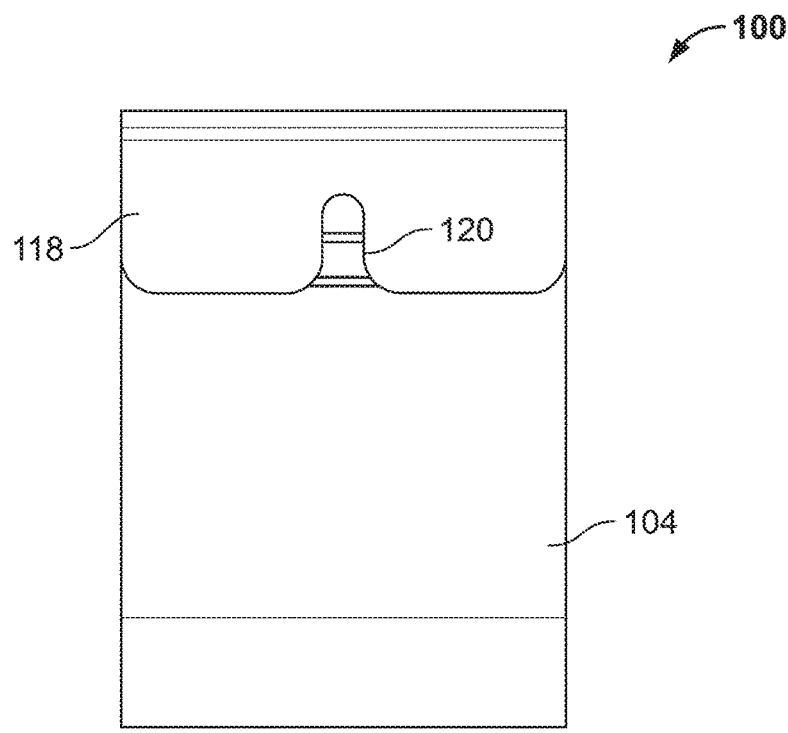
FIG. 9 is a side view of the pathway isolation fitting of FIG. 7.
Figure 10:
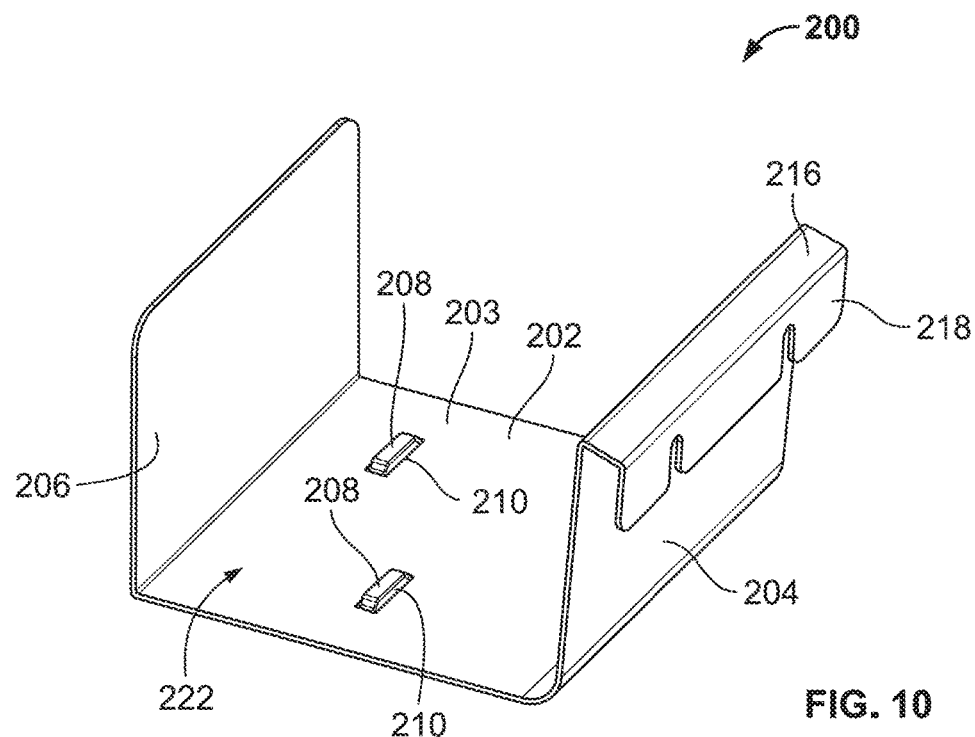
FIG. 10 is a perspective view of a further embodiment of a pathway isolation fitting in accordance with the present disclosure.
Figure 11:
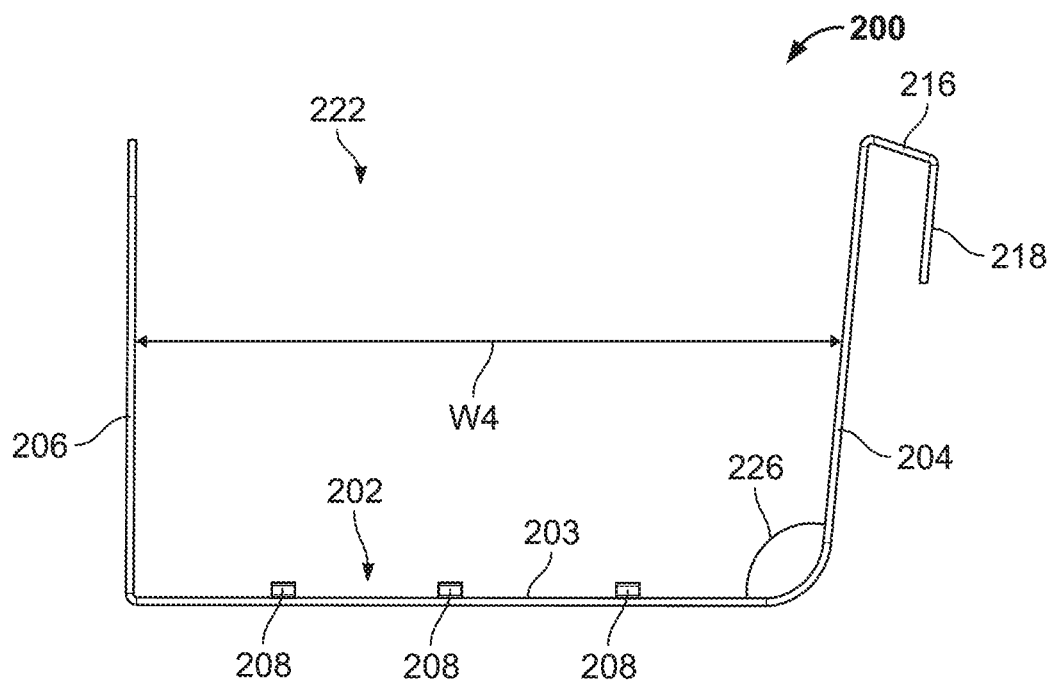
FIG. 11 is an end view of the pathway isolation fitting of FIG. 10.
Figure 12:
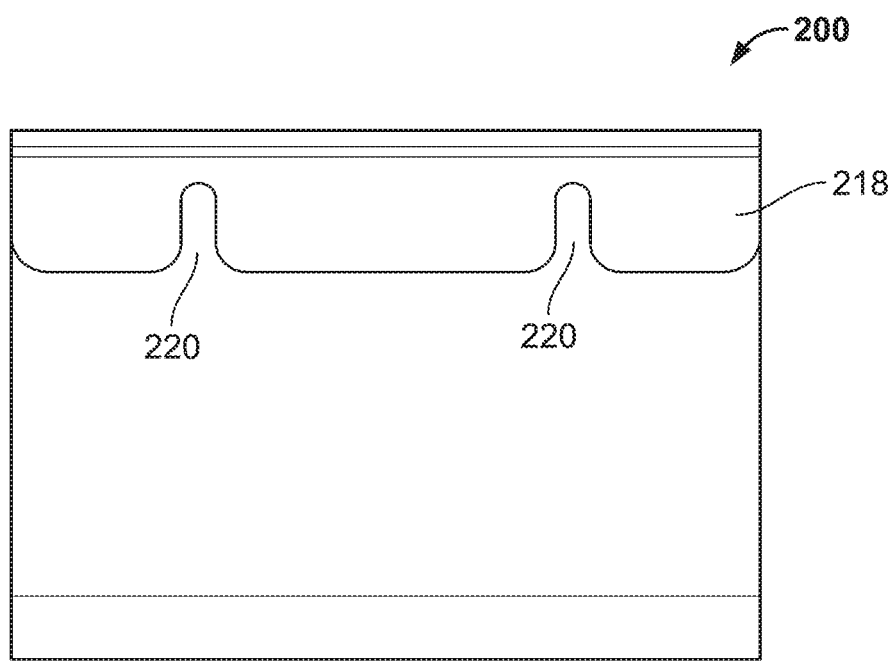
FIG. 12 is a side view of the pathway isolation fitting of FIG. 10.
Figure 13:
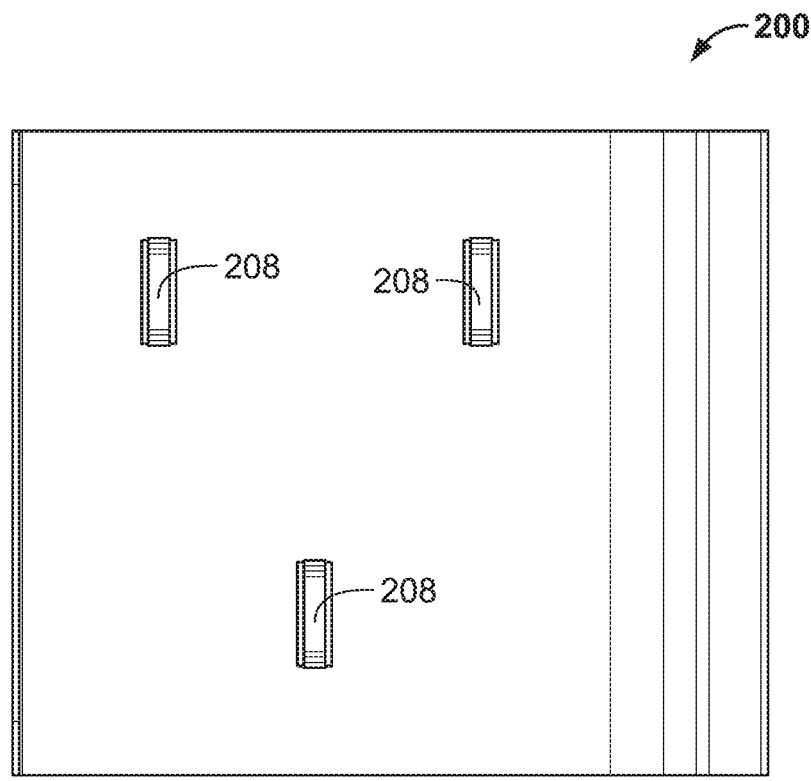
FIG. 13 is a top view of the pathway isolation fitting of FIG. 10.

Referring now to FIGS. 7-9 a further embodiment of a pathway isolation fitting 100 is depicted. The fitting 100 includes a concave bottom cable support surface 102 and two opposite sidewalls 104 and 106 extending from the support surface 102. The concavity of the bottom cable support surface 102 faces away from the bottom 126 of the fitting 100. Opposing strap retainers 108 and 110 defining slots 112 and 114 through which a tie or strap can be passed project interiorly and towards each other from the sidewalls 104 and 106. A flange 116 extends obliquely (forming an oblique angle 124) from the sidewall 104 and a projecting wall 118 extends from the flange 116 parallel to the sidewall 104. The interior contour formed by the flange 116 and projecting wall 118 (FIG. 8) is configured to complement the general contour of a mounting lip 99 (FIG. 4) protruding from the sidewall of a trough. The sidewalls 104 and 106 together with the bottom cable support surface 102 define an isolated pathway channel 122, the purpose of which has been described above. The internal width W3 of the channel 122 is less than the internal width W1 of the channel 68 (FIG. 6). The projecting wall 118 defines a notch 120 that is positioned to be in communication with the T-shaped recess 74 of a trough 42 (FIG. 3). Thus, for example, the T-shaped engaging element 86 of the fastener assembly 82 (FIG. 14) can be passed through the notch 120 and into the T-shaped recess 74 (FIG. 4) in the manner described above to couple the fitting 100 to the trough 42 (FIG. 3).

Referring now to FIGS. 10-13, a further embodiment of a pathway isolation fitting 200 is depicted. The fitting 200 includes a support surface 202 having a planar portion 203 and two opposite sidewalls 204 and 206 extending from the support surface 202. The sidewall 206 extends perpendicularly from the support surface 202, while the sidewall 204 extends obliquely from the support surface 202 forming an oblique angle 226. The obliqueness of the sidewall 204 relative to the support surface 202 matches the obliqueness of the sidewall 50 relative to the support surface 46 of the trough 42 (FIG. 4), such that when the fitting 200 is mounted to the trough 42 the planar portion 203 is parallel to the planar portion of the bottom cable support surface 46 of the trough 42 (FIG. 4), i.e., the planar portion 203 is oriented horizontally and perpendicular to the force of gravity. This orientation relative to gravity can stabilize the cables supported by the support surface 202 and minimize lateral shifting thereof.

Strap retainers 208 defining slots 210 through which ties or straps can be passed project interiorly from the bottom cable support surface 202. Such ties or straps can be, e.g., wrapped around cables to secure the cables to the bottom cable support surface 202.

A flange 216 extends obliquely (forming an oblique angle 224) from the sidewall 204 and a projecting wall 218 extends from the flange 216 parallel to the sidewall 204. The interior contour formed by the flange 216 and projecting wall 218 (FIG. 11) is configured to complement the general contour of a mounting lip 99 (FIG. 4) protruding from the sidewall of a trough. The sidewalls 204 and 206 together with the bottom cable support surface 202 define an isolated pathway channel 222, the purpose of which has been described above. The internal average width W4 of the channel 222 is greater than the internal width W1 of channel 68 (FIG. 6). The projecting wall 218 defines a pair of notches 220 that are positioned to be in communication with the T-shaped recess 74 of a trough 42 (FIG. 3). Thus, for example, a pair of T-shaped engaging elements 86 of a pair of fastener assemblies 82 (FIG. 14) can be passed through the notches 220 and into the T-shaped recess 74 (FIG. 4) in the manner described above to couple the fitting 200 to the trough 42 (FIG. 3). Due to the larger width W4, the fitting 200 can support a greater weight of cables such that two fastener assemblies 82 (FIG. 14) may needed to stabilize the mounting of the fitting to a trough.

Figure 15:
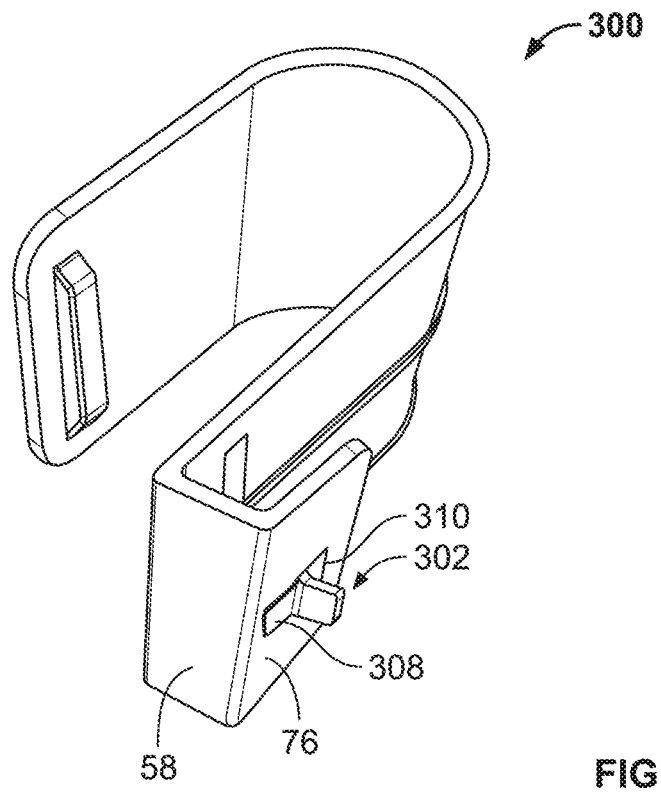
FIG. 15 is a perspective view of a further embodiment of a pathway isolation fitting in accordance with the present disclosure.
Figure 16:
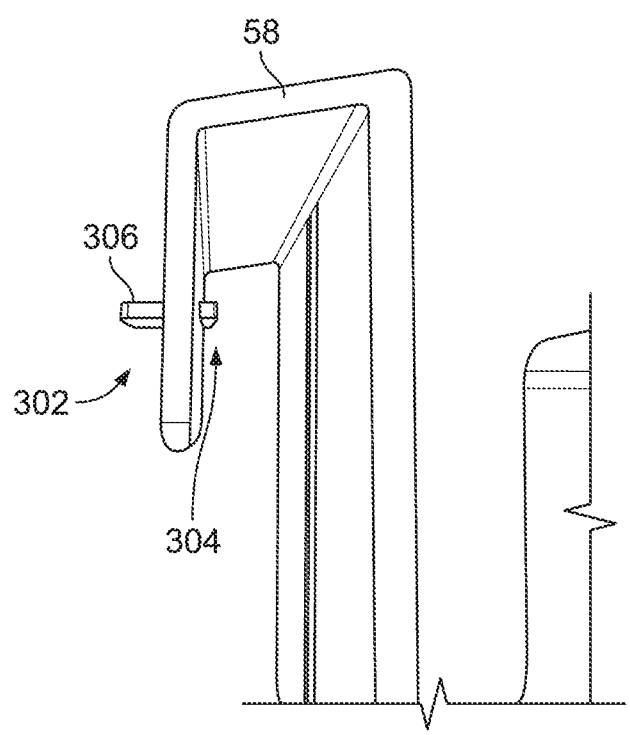
FIG. 16 is an enlarged view of a portion of the pathway isolation fitting of FIG. 15.

Referring now to FIGS. 15-16, a further embodiment of a pathway isolation fitting 300 is depicted. The fitting 300 is structurally and functionally identical to the fitting 44 described above (FIG. 3) except for the coupling mechanism used to couple the fitting 300 to a trough. The fitting 300 includes a coupling mechanism 302 supported by the projecting wall 76 that extends from the flange 58. The coupling mechanism 302 includes a latch 304 projecting from a cantilever arm 308 disposed in a window 310 defined by the projecting wall 76. The cantilever arm can flex outward until the latch 304 finds the exterior opening 97 to the T-shaped recess 74 of the lip 99 of the trough 42 (FIGS. 3-4), at which point the latch 304 can resiliently snap into the opening 97 thereby coupling the fitting 300 to the trough 42 (FIG. 3). To decouple (i.e., release) the fitting 300 from the trough, a release tab 306 extending from the cantilever arm 308 can be urged upward, causing the cantilever arm 308 to flex outward and the latch 304 to disengage the opening 97 of the lip 99. Thus, it should be appreciated, that the fitting 300 can be coupled to a trough without using a separate fastener, such as the fastener assembly 82 (FIG. 14).

Figure 18:
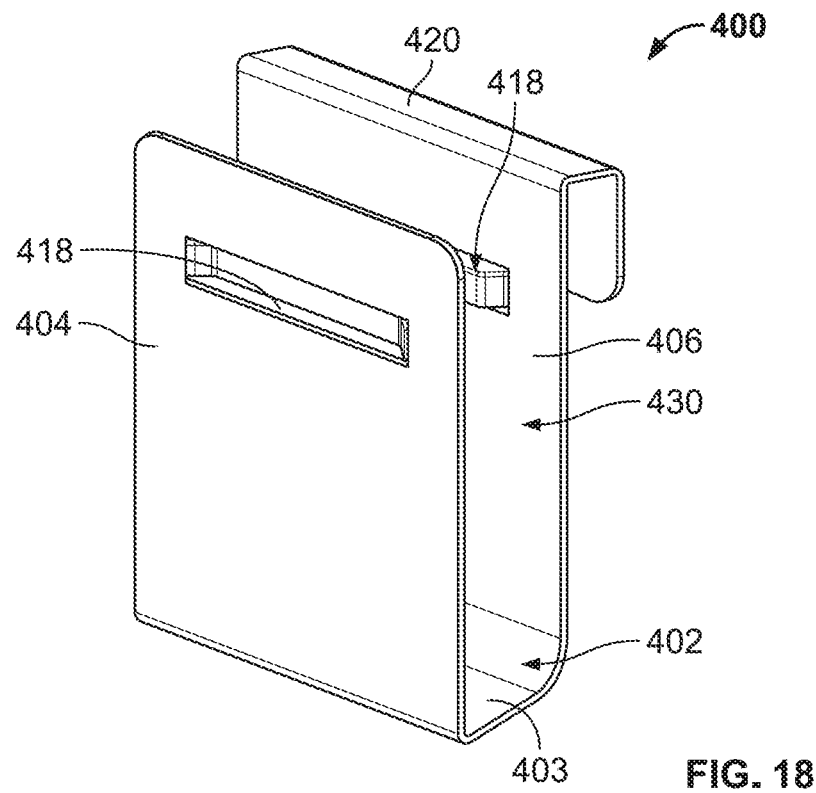
FIG. 18 is a perspective view of a further embodiment of a pathway isolation fitting in accordance with the present disclosure.
Figure 19:
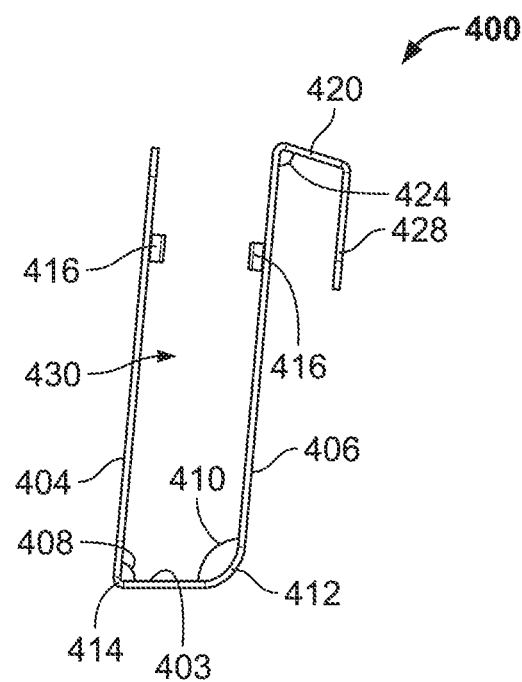
FIG. 19 is an end view of the pathway isolation fitting of FIG. 18.
Figure 20:
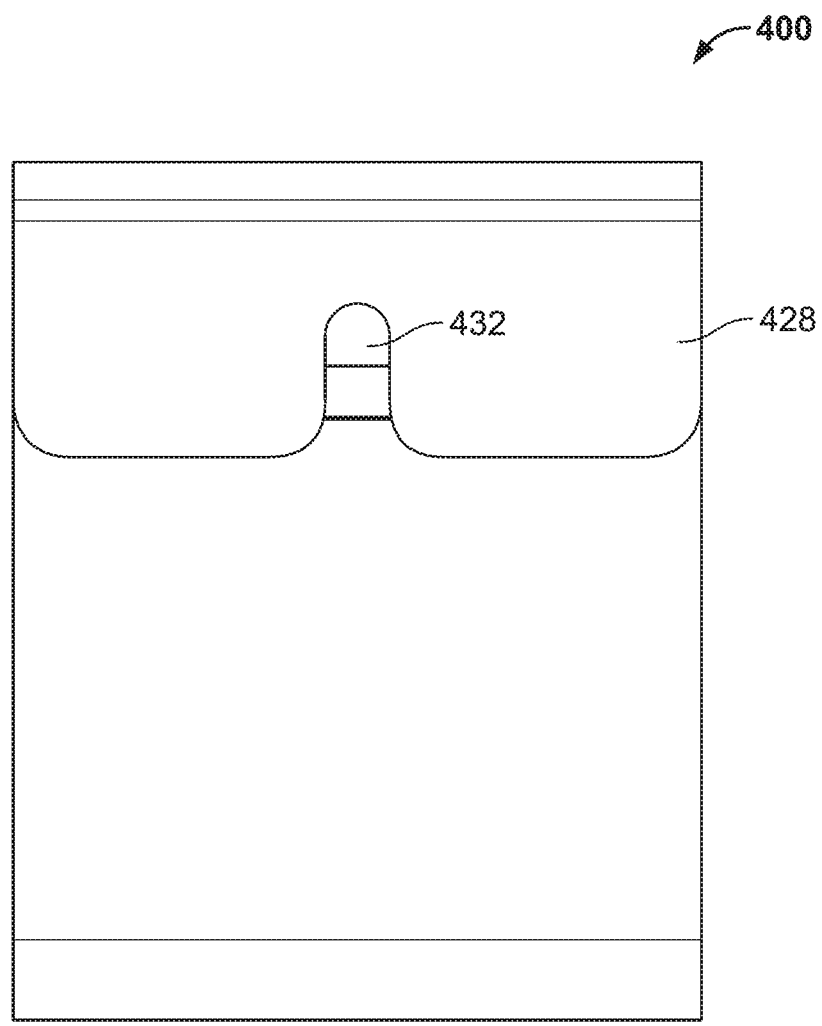
FIG. 20 is a side view of the pathway isolation fitting of FIG. 18.

Referring now to FIGS. 18-20, a further embodiment of a pathway isolation fitting 400 is depicted. The fitting 400 includes a support surface 402 having a planar portion 403 and two opposite sidewalls 404 and 406 extending from the support surface 402. The side walls 404 and 406 are parallel to each other and both extend from the support surface 402 at oblique angles 408, 410 relative to the planar portion 403. A transition portion 412 between the wall 406 and the planar portion 403 has a curvature with a greater radius of curvature than a transition portion 414 between the wall 404 and the planar portion 403. In some examples, the obliqueness of the sidewalls matches the obliqueness of the sidewall 50 relative to the support surface 46 of the trough 42 (FIG. 4), such that when the fitting 400 is mounted to the trough 42 the planar portion 403 is parallel to the planar portion of the bottom cable support surface 46 of the trough 42 (FIG. 4), i.e., the planar portion 403 is oriented horizontally and perpendicular to the force of gravity. This orientation relative to gravity can stabilize the cables supported by the support surface 402 and minimize lateral shifting thereof.

Strap retainers 416 defining slots 418 through which ties or straps can be passed project interiorly from the sidewalls 404 and 406 to help hold the sidewalls in position even when the fitting 400 is loaded.

A flange 420 extends obliquely (forming an oblique angle 424) from the sidewall 404 and a projecting wall 428 extends from the flange 420 parallel to the sidewalls 404 and 406. The interior contour formed by the flange 420 and projecting wall 428 is configured to complement the general contour of a mounting lip 99 (FIG. 4) protruding from the sidewall of a trough. The sidewalls 404 and 406 together with the bottom cable support surface 402 define an isolated pathway channel 430, the purpose of which has been described above. The projecting wall 428 defines a notch 432 that is positioned to be in communication with the T-shaped recess 74 of a trough 42 (FIG. 3).

From the foregoing detailed description, it will be evident that modifications and variations can be made in the devices of the disclosure without departing from the spirit or scope of the invention.

What is claimed is:

1. A system, comprising:
a pathway isolation fitting, the pathway isolation fitting being mountable to a fiber trough having a first bottom cable support surface and first and second opposite sidewalls extending from opposite ends of the first bottom cable support surface, the first and second sidewalls and first bottom cable support surface defining a first channel, the pathway isolation fitting being configured to be mounted to one of the first and second sidewalls and partially positioned in the first channel, the pathway isolation fitting including a second bottom cable support surface and third and fourth opposite sidewalls extending from the second bottom cable support surface, the third and fourth sidewalls and the second bottom cable support surface defining a second channel, the second channel being within the first channel when the fitting is mounted to the trough, the second bottom cable support surface including a planar portion or defining a concavity that faces away from the first bottom cable support surface when the fitting is mounted to the trough,
wherein the fitting includes a flange extending from the third sidewall;
wherein the fitting includes a projecting wall extending from the flange, the flange and the projecting wall being configured to abut a mounting lip of the trough; and
wherein the projecting wall defines a notch or a fully enclosed hole.

2. The system of claim 1, wherein the pathway isolation fitting includes a plurality of strap retainers.

3. The system of claim 2, wherein the strap retainers project towards each other from the third and fourth sidewalls.

4. The system of claim 3, further comprising a strap looped through two of the plurality of strap retainers.

5. The system of claim 1, further comprising a fastener insertable through the notch or the fully enclosed hole and including a T-shaped engaging member and a nut rotationally coupled to the T-shaped engaging member, the T-shaped engaging member being configured to be received in a T-shaped recess of the trough to securely couple the fitting to the trough.

6. The system of claim 1, further comprising the trough.

7. A system, comprising:
a fiber trough having a first bottom cable support surface and first and second opposite sidewalls extending from opposite ends of the first bottom cable support surface, the first and second sidewalls and first bottom cable support surface defining a first channel; and
a pathway isolation fitting mounted to one of the first and second sidewalls and partially positioned in the first channel, the pathway isolation fitting including a second bottom cable support surface and third and fourth opposite sidewalls extending from the second bottom cable support surface, the third and fourth sidewalls and the second bottom cable support surface defining a second channel, the second channel being within the first channel, the second bottom cable support surface including a planar portion or defining a concavity that faces away from the first bottom cable support surface,
wherein the pathway isolation fitting includes a plurality of strap retainers; and
wherein the plurality of strap retainers project from the second bottom cable support surface.

8. The system of claim 7, comprising a plurality of the pathway isolation fittings mounted to one of the first and second sidewalls at intervals.

9. The system of claim 7, wherein a bottom of the pathway isolation fitting is spaced apart from the first bottom cable support surface such that a cable supported by the first bottom cable support surface can be positioned under the bottom of the pathway isolation fitting.

10. The system of claim 7, wherein the fitting includes a flange extending from the third sidewall at an oblique angle.

11. The system of claim 10, wherein the fitting includes a projecting wall extending from the flange, the flange and the projecting wall being configured to abut a mounting lip of the trough.

12. The system of claim 7, wherein the second bottom cable support surface includes a planar portion, and wherein the third sidewall extends from the second bottom cable support surface at an angle that is oblique to the planar portion.

13. The system of claim 7, wherein a ratio of a maximum depth of the second channel to a maximum depth of the first channel is in a range from 19:20 to 1:2, inclusive.

14. The system of claim 13, wherein a ratio of a maximum width of the second channel to a maximum width of the first channel is in a range from about 1:2 to 1:10, inclusive.

15. The system of claim 7, wherein the second bottom cable support surface includes a planar portion, and wherein the third and fourth sidewalls extend from the second bottom cable support surface at angles that are oblique to the planar portion, the third and fourth sidewalls being parallel to each other.

16. A system, comprising:
a first plurality of cables;
a second plurality of cables;
a fiber trough having a first bottom cable support surface and first and second opposite sidewalls extending from opposite ends of the first bottom cable support surface, the first and second sidewalls and first bottom cable support surface defining a first channel; and
a pathway isolation fitting mounted to one of the first and second sidewalls and partially positioned in the first channel, the pathway isolation fitting including a second bottom cable support surface and third and fourth opposite sidewalls extending from the second bottom cable support surface, the third and fourth sidewalls and the second bottom cable support surface defining a second channel, the second channel being within the first channel, wherein the first plurality of cables are routed through the first channel and are supported by the first bottom cable support surface;

wherein the second plurality of cables are routed through the second channel and are supported by the second bottom cable support surface;

wherein the second plurality of cables are not supported by the first bottom cable support surface; and wherein the first plurality of cables are not supported by the second bottom cable support surface.

17. The system of claim 16, wherein the first plurality of cables are one of optical cables and copper cables and the second plurality of cables are the other of optical cables and copper cables.

18. The system of claim 17, wherein the first plurality of cables are optical cables and the second plurality of cables are copper cables.

19. The system of claim 16, wherein the second bottom cable support surface defines a concavity that faces away from the first bottom cable support surface.

20. The system of claim 16, wherein the first plurality of cables and/or the second plurality of cables are bundled.

21. A system, comprising:
a pathway isolation fitting, the pathway isolation fitting being mountable to a fiber trough having a first bottom cable support surface and first and second opposite sidewalls extending from opposite ends of the first bottom cable support surface, the first and second sidewalls and first bottom cable support surface defining a first channel, the pathway isolation fitting being configured to be mounted to one of the first and second sidewalls and partially positioned in the first channel, the pathway isolation fitting including a second bottom cable support surface and third and fourth opposite sidewalls extending from the second bottom cable support surface, the third and fourth sidewalls and the second bottom cable support surface defining a second channel, the second channel being within the first channel when the fitting is mounted to the trough, the second bottom cable support surface including a planar portion or defining a concavity that faces away from the first bottom cable support surface when the fitting is mounted to the trough, wherein the pathway isolation fitting includes a plurality of strap retainers; and wherein the strap retainers project from the second bottom cable support surface.

22. The system of claim 21, further comprising the trough.

23. A system, comprising:
a fiber trough having a first bottom cable support surface and first and second opposite sidewalls extending from opposite ends of the first bottom cable support surface, the first and second sidewalls and first bottom cable support surface defining a first channel; and a pathway isolation fitting mounted to one of the first and second sidewalls and partially positioned in the first channel, the pathway isolation fitting including a second bottom cable support surface and third and fourth opposite sidewalls extending from the second bottom cable support surface, the third and fourth sidewalls and the second bottom cable support surface defining a second channel, the second channel being within the first channel, the second bottom cable support surface including a planar portion or defining a concavity that faces away from the first bottom cable support surface, wherein the fitting includes a flange extending from the third sidewall at an oblique angle;

wherein the fitting includes a projecting wall extending from the flange, the flange and the projecting wall being configured to abut a mounting lip of the trough;

wherein the projecting wall extends from the flange parallel to the third side wall; and wherein the projecting wall defines a notch or a fully enclosed hole.

24. The system of claim 23, further comprising a fastener insertable through the notch or the fully enclosed hole and including a T-shaped engaging member and a nut rotationally coupled to the T-shaped engaging member.

25. The system of claim 23, wherein the projecting wall defines a window and includes a cantilever arm positioned in the window, the cantilever arm including a latch.

26. The system of claim 25, wherein the cantilever arm further includes a release tab.

* * * * *

UNITED STATES PATENT AND TRADEMARK OFFICE
CERTIFICATE OF CORRECTION

| | | |
|---|---|---|
| PATENT NO. | : 12,027,837 B2 | |
| APPLICATION NO. | : 17/611858 | |
| DATED | : July 2, 2024 | |
| INVENTOR(S) | : Scott Jean Anderson et al. | |

It is certified that error appears in the above-identified patent and that said Letters Patent is hereby corrected as shown below:

On the Title Page

FOREIGN PATENT DOCUMENTS: "1/1995" should read --11/1995--

In the Specification

Column 1, Line 10: "of which i-s are" should read --of which are--

Signed and Sealed this
Eighth Day of October, 2024

Katherine Kelly Vidal
*Director of the United States Patent and Trademark Office*